No. 730,523. PATENTED JUNE 9, 1903.
H. H. DOW.
MEANS FOR PREVENTING ARCING IN DIRECT CURRENT MOTORS
OR GENERATORS.
APPLICATION FILED JAN. 2, 1903.
NO MODEL.
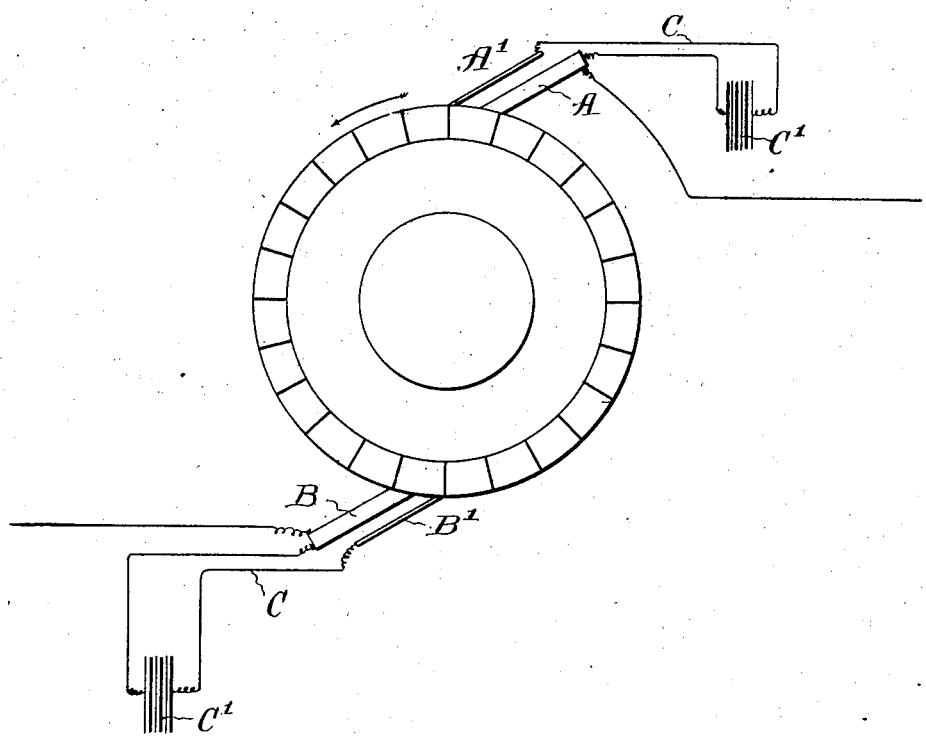
Witnesses
D. T. Davies
N. E. Merkel
Inventor
H. H. Dow
by J. B. Fay,
Atty.

No. 730,523. Patented June 9, 1903

UNITED STATES PATENT OFFICE.

HERBERT H. DOW, OF MIDLAND, MICHIGAN.

MEANS FOR PREVENTING ARCING IN DIRECT-CURRENT MOTORS OR GENERATORS.

SPECIFICATION forming part of Letters Patent No. 730,523, dated June 9, 1903.

Application filed January 2, 1903. Serial No. 137,458. (No model.)

*To all whom it may concern:*

Be it known that I, HERBERT H. DOW, a citizen of the United States, and a resident of Midland, county of Midland, and State of Michigan, have invented a new and useful Improvement in Means for Preventing Arcing in Direct-Current Motors or Generators, of which the following is a specification, the principle of the invention being herein explained and the best mode in which I have contemplated applying that principle, so as to distinguish it from other inventions.

My invention relates to devices for the prevention of arcing in direct-current motors or generators and the like, its object being to provide means for accomplishing the required object in an economical and efficacious manner.

Said invention consists of a specific application of the principle of the invention described and claimed in United States Letters Patent No. 692,432, issued to me February 4, 1902, such specific application being hereinafter described, and specifically set forth in the claims.

The annexed drawing and the following description set forth in detail certain specific means embodying the said invention, such disclosed specific means constituting, however, but one of various forms in which the principle of the invention may be used.

In said annexed drawing the figure represents a diagrammatic view of a commutator of a direct-current generator or motor, illustrating my invention applied thereto.

In proximity to each of the two main brushes A and B of the dynamo is placed an auxiliary brush A' and B', respectively. Each such auxiliary brush is set a distance from its respective main brush such that the interval between them shall be not greater than the width of one commutator-segment. Each main brush is connected with its auxiliary brush by means of a conductor C, including a polarizing-battery C', capable of generating a counter-electromotive force equal to the electromotive force of the short-circuited coil.

The operation of the above-described device depends upon the fact, as set forth in said Patent No. 692,432, that if an electric current be passed through an electrolyte between two insoluble electrodes the latter becomes polarized as the decomposition of the electrolyte proceeds. This polarization, starting at zero, rises rapidly to a limiting value depending upon the character of the electrolyte and manifests itself as an electromotive force counter to that of the polarizing-current, the passage of which it resists. If a sufficient number of such electrolytic couples be connected in series, so that the polarization electromotive force of the battery equals or exceeds that of the polarizing-current, then the battery will be capable of entirely stopping the polarizing-current if connected in opposition to it. If an unpolarized battery of this description be brought into an electric circuit, the counter electromotive force will rise rapidly from a zero value to that of the polarizing-current and will be gradually yet quickly checked and stop said polarizing-current with an action similar to that of a cushion or a spring when arresting the blow of a hammer.

This principle as applied above described to a dynamo eliminates the destructive arcing which is a result of the leaping of the current across the gap formed by the brushes and segments by diverting the current simultaneously with the formation of the arc and breaking of contact into the conductor C and through the battery C', which latter gradually but very rapidly becomes polarized and generates a counter electromotive force equal to that of the current in the dynamo-circuit, so as to completely shut off the latter.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. In a direct-current motor or generator, means for preventing arcing comprising the combination with the commutator, of means including a polarizing-battery for connecting contiguous commutator-segments.

2. In a direct-current motor or generator, means for preventing arcing comprising the combination of the commutator, two brushes, and means including a polarizing-battery for connecting the latter.

3. In a direct-current motor or generator, means for preventing arcing comprising the combination of the commutator, two brushes, and means connecting the latter including a polarizing-battery, such brushes and connection adapted to connect contiguous commutator-segments.

4. In a direct-current motor or generator, the combination of a commutator, two brushes resting upon the commutator separated by a space less than the thickness of one commutator-segment and means connecting said two brushes capable of generating counter electromotive force.

5. In a direct-current motor or generator, the combination of a commutator, two brushes, resting upon the commutator separated by a space less than the thickness of one commutator-segment and a polarizing-battery connecting said two brushes capable of generating counter electromotive force.

Signed by me this 30th day of December, 1902.

HERBERT H. DOW.

Attest:
FLORA M. THOMPSON,
A. E. MERKEL.